(12) United States Patent
Baruchello et al.

(10) Patent No.: US 7,168,179 B2
(45) Date of Patent: Jan. 30, 2007

(54) TOUCH PROBE COMPRISING A SWITCH WITH CONTACTS PROTECTED BY INERT GAS

(75) Inventors: Roberto Baruchello, Oxford, MI (US); Alessandro Forni, S. Giovanni In Persiceto (IT)

(73) Assignee: Marposs Societa ' per Azioni, Bentivoglio (IT)

( * ) Notice: Subject to any disclaimer, the term of this patent is extended or adjusted under 35 U.S.C. 154(b) by 93 days.

(21) Appl. No.: 10/530,350

(22) PCT Filed: Sep. 29, 2003

(86) PCT No.: PCT/EP03/10805

§ 371 (c)(1),
(2), (4) Date: Apr. 6, 2005

(87) PCT Pub. No.: WO2004/031684

PCT Pub. Date: Apr. 15, 2004

(65) Prior Publication Data

US 2006/0260148 A1    Nov. 23, 2006

(51) Int. Cl.
*G01B 5/00*    (2006.01)

(52) U.S. Cl. .......................... 33/561; 33/558

(58) Field of Classification Search ................. 33/556, 33/558, 559–561
See application file for complete search history.

(56) References Cited

U.S. PATENT DOCUMENTS

| | | | |
|---|---|---|---|
| 4,577,416 A * | 3/1986 | Franz | 33/561 |
| 4,789,762 A | 12/1988 | Miller et al. | |
| 5,299,360 A | 4/1994 | Possati et al. | |
| 5,319,858 A | 6/1994 | Coy | |
| 7,051,577 B2 * | 5/2006 | Komninos | 73/40.5 A |
| 2005/0268478 A1 * | 12/2005 | Baruchello et al. | 33/561 |
| 2006/0162176 A1 * | 7/2006 | Lummes et al. | 33/556 |

FOREIGN PATENT DOCUMENTS

| | | |
|---|---|---|
| GB | 2 145 523 | 3/1985 |
| WO | WO 00/17602 | 3/2000 |

* cited by examiner

*Primary Examiner*—Yaritza Guadalupe-McCall
(74) *Attorney, Agent, or Firm*—Dickstein Shapiro LLP

(57) ABSTRACT

A touch probe with an arm (13) coupled to a movable arm-set (3) supported in a casing (1) includes an electric switch (31) with a housing (33) fixed to the casing and a mechanical transmission device (61) for mechanically transmitting displacements of the arm, and causing the disengagement of a conductive small ball (51) from two stationary conductive bars (44,45), thereby opening an electric detecting circuit. At the interior of the probe casing, a sealingly closed chamber houses the switch and is filled with inert gas, for example nitrogen, for protecting the electric contacts.

11 Claims, 2 Drawing Sheets

TOUCH PROBE COMPRISING A SWITCH WITH CONTACTS PROTECTED BY INERT GAS

TECHNICAL FIELD

The invention relates to a touch probe, including a casing that defines a longitudinal geometric axis, a movable arm-set housed in the casing, an arm rigidly coupled to the movable arm-set, with an end extending out of the casing, a feeler coupled to said end of the arm, and an electric switch adapted for detecting displacements of the movable arm-set with respect to the casing and including at least a stationary contact and a movable contact, a housing enclosing the stationary contact and the movable contact and a contact protecting fluid for protecting the contacts, and a mechanical transmission device adapted for transmitting displacements of the movable arm-set to the movable contact.

BACKGROUND ART

Touch probes with movable arm-sets that carry feelers are utilized in coordinate measuring machines and in machine tools, more specifically in machining centers and lathes, for carrying out checkings on machined or to be machined pieces, on the tools, on the machine tables, etc. In each of these probes, contact between feeler and, for example, a mechanical piece is monitored by suitable devices which detect specific displacements of the movable arm-set with respect to a casing and control the reading of transducers associated with the machine slides, that provide measurement values with respect to a reference position or origin.

A probe detecting and monitoring device can foresee the utilization of an electric circuit and of (at least) an associated switch that, actuated in a mechanical way as a result of displacements occurring between the movable arm and the casing, causes the closure or, more frequently, the opening of the circuit.

The U.S. Pat. No. 5,299,360 discloses probes according to the preamble of claim 1, each including a microswitch with a stem having a free end that cooperates with the movable arm-set. More specifically, in each of said probes, the coupling between the movable arm-set and the stationary casing is such that, further to displacements of the feeler in a longitudinal direction or in a transversal direction, there occurs the lifting of an abutment surface of the movable arm-set that is near the microswitch and the consequent thrust on the stem, the disengagement of the contacts and the opening of the electric circuit.

An extremely important characteristic that touch probes are required to have is a high standard of repeatability i.e. a close correlation between specific positions taken by the feeler and the opening of the electric circuit.

In order to improve said characteristic, the mutual arrangement among the component parts of the switch is accurately defined insofar as, among other things, the aligning—along a longitudinal axis of the thrust spring—of the movable contact, generally ball shaped, and of the stem is concerned. Although the probes disclosed in U.S. Pat. No. 5,299,360 guarantee good repeatability, an absolutely perfect alignment between the component parts of the switch is not however possible. Furthermore, variations in the mutual positions of the stem and of the other component parts of the microswitch due to clearances in the longitudinal guide system and/or possible rotations of the stem about its axis, even though of extremely small entity, can negatively affect the repeatability of the probe. This is especially true in recent high precision applications in which it is required that the repeatability errors be particularly small, considerably smaller than 1 μm.

Other inconveniences that occur in the known probes as, for example, those disclosed in the formerly mentioned U.S. Pat. No. 5,299,360, but not just in those probes, hang on the reliability of the electric contacts of the microswitch. In fact, although the probes are protected by gaskets of various types, they cannot be, in general, considered hermetically sealed, more particularly the rubber gaskets are not entirely sealed against oxygen and water vapour. These two elements, oxygen and water vapour, put together or separately, concur to oxidation processes of the microswitch electric contacts and hence lead to cause malfunctionings, that can affect the reliability of the probe. In order to avoid the occurring of these negative processes, it is known to utilize, at the interior of the microswitch, lubricating fluid ("oil") for protecting the contacts. However, although the presence of oil considerably improves the reliability of the contacts, it can interfere with the metrological performance of the probe, in particular negatively affect its repeatability. In fact, the instant when the opening of the contacts—that are fed with very low voltages—is detected can be altered in an unforeseeable way owing to the presence of oil on the contacts.

DISCLOSURE OF INVENTION

An object of the present invention is to provide touch probes that, by maintaining the known structure substantially unaltered and by utilizing extremely simple and economic means, attain an improvement in the performance and, in particular, an extremely high standard of repeatability.

This object is achieved by a probe according to claim 1.

An important advantage that the invention provides is an effective improvement in the performance of the probes, and thus a more accurate machining of the pieces controlled by said probes, by utilizing extremely simple and economic means.

BRIEF DESCRIPTION OF THE DRAWINGS

Other profitable features of the invention will appear from the following detailed description when considered in connection with the enclosed sheets of drawings, given by way of non-limiting example, wherein.

BEST MODE FOR CARRYING OUT THE INVENTION

Figure 1:
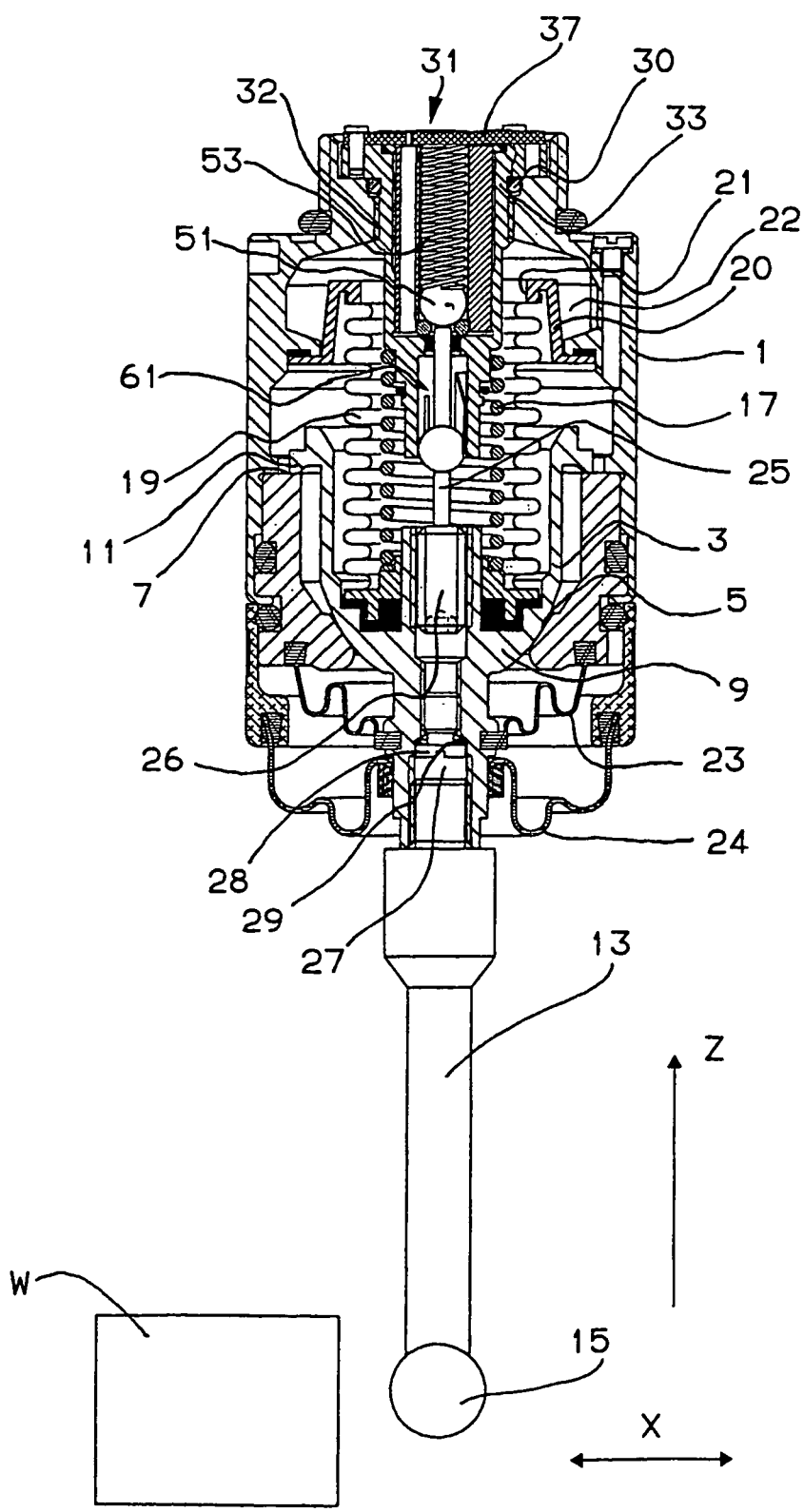
FIG. 1 is a longitudinal cross-sectional view of a touch probe according to a preferred embodiment of the invention, with some details shown in front view.

The probe shown in FIG. 1 includes support means with a casing 1—that is hollow, of a substantially cylindrical shape and consists, for example, of a plurality of mutually assembled portions—that defines a longitudinal geometric axis, and a movable arm-set 3 housed and supported in casing 1. Casing 1 includes two reference areas for the movable arm-set, more specifically a substantially frusto-conical seat 5 and an abutment area 7 with plane annular surface. In turn the movable arm-set 3 defines a longitudinal axis of symmetry and includes a central reference portion 9, having substantially the shape of a spherical segment defining a spherical zone, and an abutment flange 11 with annular surface. An arm 13 is coupled to the movable arm-set 3 and a feeler 1S is fixed to a free end of arm 13.

A helical spring 17 has its ends in abutment against two plane surfaces, integral with the movable arm-set 3 and the casing 1, respectively, and urges the central reference portion 9 against seat 5.

When movable arm-set 3 is in the inoperative condition of FIG. 1, symmetrically arranged with respect to the longitudinal geometric axis defined by casing 1, the substantially spherical zone of the central portion 9 is housed in seat 5 with substantially circular mutual contact, whereas the annular surface of the abutment flange 11 is at a distance of a few micrometers from the abutment area 7 of casing 1. The existence of this clearance, that cannot be identified in the figure, determines the correct operation of the head according to the described embodiment, as detailedly outlined in the formerly mentioned U.S. Pat. No. 5,299,360, to which reference can be made for a more detailed description.

It should be noted that a different embodiment of the present invention—that will be more extensively disclosed in the following description—foresees, instead, that the abutment flange 11 be—when the probe is in the inoperative condition—in contact with the abutment area 7 of casing 1, urged by the thrust of spring 17. In this case there will be a radial clearance of a few micrometers between the central portion 9 of the movable arm-set 3 and the seat 5.

An antirotation device, adapted for preventing the rotation of the movable arm-set 3 about the previously mentioned longitudinal axis of symmetry, includes a metal bellows 19 fixed to the arm-set 3 and to a suitable mechanical coupling element, or bucket, 20, rigidly coupled (for example glued) to casing 1. The bucket 20 has an axial opening 21 and is coupled to casing 1 in such a way to define, with internal surfaces of casing 1, a recess 22, in communication with the interior of the bellows 19. Two flexible, protective and sealing elements 23 and 24 are arranged between the arm 13 and the casing 1.

The contact occurring between feeler 15 and a piece W is detected, after completion of a determined pre-stroke in the longitudinal direction, or, in the case of displacements of the feeler 15 in the transversal direction, at a determined angle between the geometric axis of casing 1 and the axis of symmetry of the arm-set 3, by means of a detecting device including an electric switch, or microswitch 31, rigidly coupled to the casing 1 of the probe, for example, by means of a threaded coupling 32 and a ring gasket (or "O-ring") 30.

Figure 3:
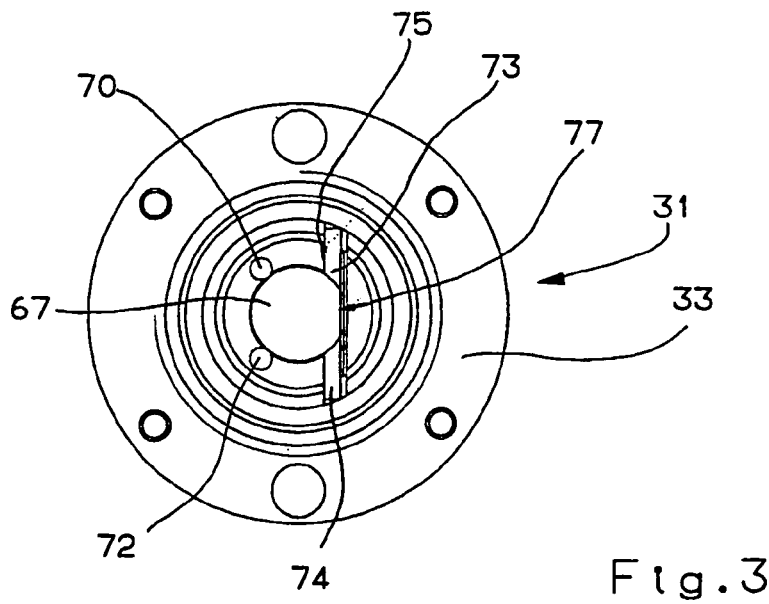
FIG. 3 shows the component of FIG. 2, when viewed from the bottom and in the direction indicated by arrow III of FIG. 2.
Figure 2:
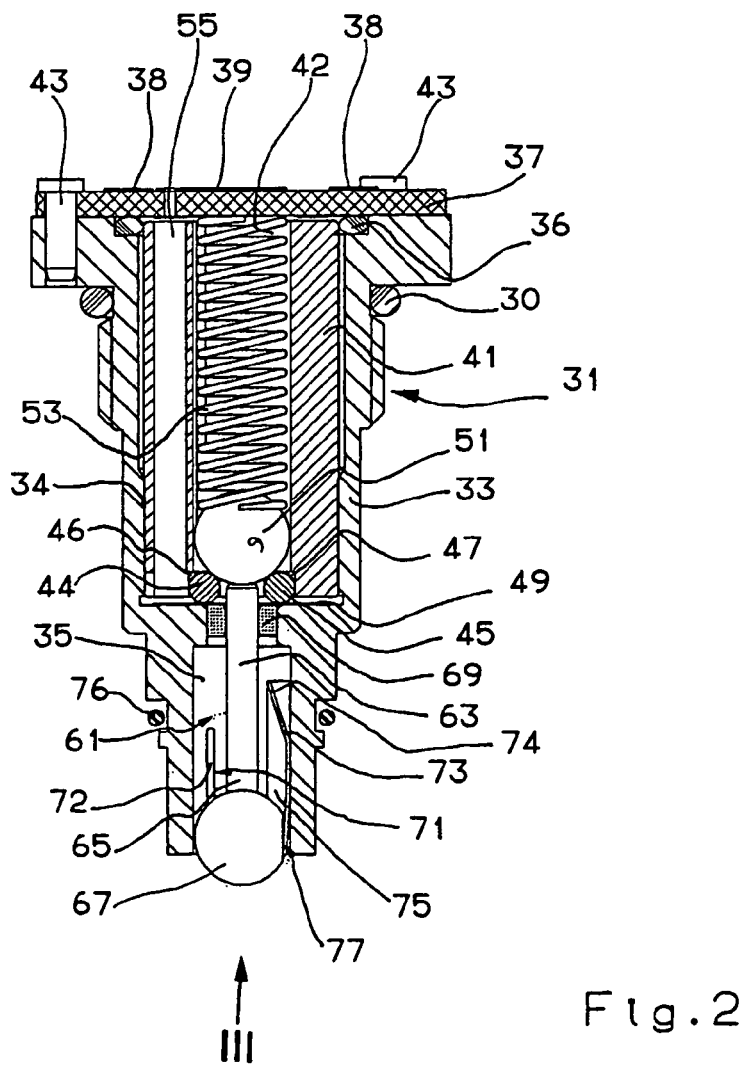
FIG. 2 is an enlarged longitudinal cross-sectional view of a component of the probe shown in FIG. 1.

The microswitch 31, also illustrated in FIGS. 2 and 3, includes a housing 33 with a longitudinal through hole that defines two cylindrical openings 34 and 35, with different diameter. A closure plate 37, made from insulating material, is fixed to housing 33 by means of rivets or screws 43 and seals—by compressing in a suitable seat a ring gasket (or "O-ring") 36—an end of the through hole located at opening 34. Plate 37 carries, on its external surface, electrically-conductive tracks 38 and 39, shown in simplified, cross-sectional form in FIG. 2.

A cylindrical insulating element 41, for example made from plastic, is inserted in the opening 34 and fitted into it and defines an axial guide hole 42 that is consequently located in a substantially concentric position with respect to the longitudinal geometric axis.

Stationary contacts are achieved by means of two cylindrical conductive bars 44 and 45, inserted and also fitted into associated mutually parallel transversal seats 46 and 47 defined in part by the insulating element 41 and in part by internal surfaces of the opening 34, with a disk made from insulating material arranged therebetween, the disk being represented in simplified form by a thick line and identified by reference number 49 in FIG. 2. The disk 49 electrically insulates the bars 44 and 45 from housing 33, the latter being made from conductive material.

A small ball 51 made from electrically-conductive material provides a movable contact and is housed, with small clearance, in hole 42. A compression spring 53, also inserted in hole 42, urges the small ball 51 against the bars 44 and 45. When the small ball 51 contacts both bars 44 and 45, the microswitch 31 is closed, whereas when the small ball 51 disengages from at least one of bars 44 and 45, the microswitch 31 is open.

Electrically-conductive elements or wires, not shown in the drawings for the sake of simplicity and clarity, are housed in longitudinal holes 55 (one is shown in the figures) and electrically connect the bars 44 and 45 to the two conductive tracks 38 and 39, respectively, that are in turn coupled to the leads of a cable, not shown in the drawings, for connecting—possibly by means of wireless transmission devices, interface devices, etc.—the microswitch 31 to a known control and measurement detecting unit, not shown in the drawing either.

Furthermore, microswitch 31 includes an actuator, or mechanical transmission device, 61—for transmitting to the movable contact 51 displacements of the movable arm-set 3—substantially housed in the cylindrical opening 35. An elongate mechanical body 63 of the transmission device 61 is arranged substantially along a longitudinal direction and includes two abutment ends that protrude from the opposite ends of the opening 35, for cooperating, respectively, with the small ball 51 in opening 34 and with the end of a transmission pin 25, that is part of the movable arm-set 3 and is substantially aligned along the longitudinal axis of symmetry.

The elongate mechanical body 63 includes a pushing stem 65 and a transmission element 67 with substantially spherical surface, the latter being integrally coupled, for example glued, to an end of the former.

The mechanical transmission device 61 also includes guide elements for the body 63. More specifically, a bushing 69—per se known, for example made from sapphire—is internally fixed to the housing 33, in an intermediate portion with reduced diameter, between the openings 34 and 35 and contributes to guide, with limited clearance, longitudinal displacements of stem 65 near small ball 51. The internal surface of opening 35 defines substantially longitudinal guide surfaces that achieve a binary 71, said surfaces being, in the embodiment shown in the figures, the lateral ones of a pair of cylindrical bars 70 and 72 arranged side by side, glued at the interior of said opening 35. The cylindrical bars 70 and 72 are made, for instance, from zirconium oxide, which is a material that, like sapphire, does not conduct and has specific hardness characteristics, low friction coefficient and high resistance to corrosion and wear.

Among the guide elements there is an elastic thrust element, more specifically a bent flat spring 73, also housed in opening 35 at an opposite position with respect to the surfaces that define the binary 71. More specifically, housing 33 includes, at the part ending with opening 35, a longitudinal slit 75 where the flat spring 73 is inserted in such a way that a larger end 74 of said spring 73 transversally extends out of the slit 75 (FIG. 3). An annular locking element 76 (for example, an elastic element) is located in a suitable annular seat of the external surface of the housing 33 and prevents the falling of the flat spring 73. The bent flat spring 73 cooperates on one side with the housing 33 (transversal thrust between the larger end 74 and the walls of the slit 75) and on the other side with the transmission element 67 at a substantially plane portion 77 of its surface—otherwise of a spherical shape—of the latter element.

The flat spring 73 transversally urges the transmission element 67 against the surfaces of the binary 71 with an extremely limited force (for example, just a few grams) that is sufficient for causing the longitudinal displacements of element 67 to be guided by the surfaces of the binary 71 free of clearances. Moreover, the specific geometric features and the arrangement of the mechanical body 63 determine that, thanks to the thrust that spring 73 applies to the transmission element 67, the pushing stem 65 leans in a repeatable way on an identical area of the guide surface of the bushing 69, at the opposite side with respect to the binary 71, so as to achieve that the longitudinal displacements of the whole body 63 be guided free of clearance and in a repeatable way, according to a defined kinematic trajectory.

The previously mentioned transmission pin 25 is coupled with a central part of the movable arm-set 3 in an adjustable way. More specifically, pin 25 is integral with a threaded dowel 26 that is in turn screwed into a first threaded end portion of an axial through hole 27 of the arm-set 3. The through hole 27 has portions which have different diameter, among them a second threaded end portion, for the coupling of the arm 13, and an intermediate threaded area that houses the body of a closure screw 28. The head of the closure screw 28 compresses a ring shaped gasket (or "O-ring") 29 and seals the axial through hole 27.

The part of the through hole 27 facing the interior of the probe, the space defined by the bellows 19, the recess 22 and the longitudinal through hole (openings 34 and 35) of the housing 33 of the microswitch 31 define a sealingly closed chamber that is full of a contact protecting fluid, more specifically nitrogen ($N_2$). Nitrogen, that is an inert gas, is inserted in the chamber through hole 27, prior to sealing by means of screw 28 and O-ring 29.

As previously mentioned, a probe according to the invention can foresee other embodiments of insofar as the mutual arrangement between movable arm-set 3 and casing 1 in the inoperative condition are concerned. As an alternative to the embodiment including some of the characteristics disclosed in U.S. Pat. No. 5,299,360 (hereinafter referred to as "Probe A") with clearance between flange 11 and casing 1 in the inoperative condition, there can be foreseen an embodiment in which—in said inoperative condition—the abutment flange 11 rests on the abutment area 7 of the casing 1 (embodiment hereinafter referred to as "Probe B"). It should be noted that FIG. 1 wishes to represent both the embodiments (Probes A and B) wherein the clearances of some micrometers—existing in the first case between the abutment flange 11 and area 7 and in the second case between the central portion 9 of the arm-set 3 and the seat 5 of the casing 1—cannot be seen. The operation of the probe according to the two embodiments is as follows.

When there is no contact between feeler 15 and piece W to be checked, the movable arm-set 3 is supported in casing 1 by the cone-ball type coupling existing between the portion 9 of the arm-set 3 and the seat 5 (Probe A), or between the abutment flange 11 and the abutment area 7 (Probe B) and the end portions of mechanical body 63 face the small ball 51 and, respectively, the end part of the transmission pin 25. At least one of the two elements (small ball 51 and pin 25) is separate from the associated end of body 63 by an extremely limited amount of space, not shown in the figure for the sake of simplicity. The electric circuit to which the conductive bars 44, 45 and the small ball 51 belong is closed.

Further to mutual displacements between the probe and the piece W, and to contact between the feeler 15 and a surface of the piece W, arm 13 and arm-set 3 displace integrally with respect to casing 1.

In the event contact occurs between feeler 14 and piece W along a longitudinal direction (arrow Z in FIG. 1), in the case of both Probe A and Probe B there occurs a lifting of the movable arm-set 3, and more specifically of the end surface of the transmission pin 25, with a substantially translation displacement. Conversely, in the case of contact occurring between feeler 15 and piece W along a transversal direction (arrow X in FIG. 1), in Probe A there generally occurs a first, limited rotation of the arm-set 3 enabled by the cone-ball coupling, and the contact that is made substantially at a point between the annular surfaces of the flange 11 and of the area 7 causes a lifting (in other words a displacement including a longitudinal component) of the end surface of the pin 25 further to a tilting of the arm-set 3 about said point of contact.

In the case of Probe B, contact between feeler 15 and piece W in the transversal direction X determines, in general, a first, limited translation of the arm-set 3 enabled by the clearance existing between the central portion 9 and the seat 5, and a subsequent displacing away of the annular surface of the flange 11 from the surface of the area 7, the two surfaces maintaining contact substantially at a point about which the arm-set 3 tilts. In this case too, the tilting of the arm-set 3 causes a lifting (in other words a displacement including a longitudinal component) of the end surface of the pin 25.

In all the briefly described cases, the end surface of the pin 25 touches the spherical surface of the transmission element 67 and urges the mechanical body 63 that longitudinally translates and is guided free of clearance by the cooperation between element 67 and binary 71. The latter elements are held one against the other by the thrust of the spring 73 that also causes the transversal repeatable leaning of the stem 65 on a portion of the guide surface of bushing 69. Upon completion of a prestroke, the pushing stem 65 urges the small ball 51 to oppose the action of the spring 53 and to open the electric circuit. The opening of the circuit, that indicates the occurrence of contact between feeler 15 and piece W, is monitored in the control and measurement detecting unit.

The longitudinal translation displacement of body 63, in addition to being guided free of clearance as previously emphasized, is constrained by the coupling between the flat spring 73 and the substantially plane portion 77 of the transmission element 67. In fact, this coupling limits or rather prevents, in substance, rotations of body 63 about its axis. Consequently, there is the elimination of, or at least the considerable limitation of, errors due to the combined action, on the one hand of unavoidable although minimum misalignments of the component parts of the microswitch 31 along the longitudinal axis (stem 65, center of the small ball 51 and intermediate point between the bars 44 and 45), and on the other hand of shape, manufacturing or wear defects of the end surfaces of the body 63. Similar shape defects could determine micrometric alterations with respect to the theoretical values of the distances existing between the end surfaces of the body 63 and, respectively, the small ball 51 and the transmission pin 25. By preventing axial rotations of the body 63, the values of said distances do not depend on the aforementioned misalignments and shape defects, and remain substantially unaltered in the course of the operation of the probe. In this way during the probe operation, the distance that the surface of pin 25 has to cover in order to cause, by urging the elongate body 63, the detaching of the small ball 51 from the conductive bars 44 and 45 and so determine the opening of the circuit is substantially unchanged.

The result of all this is a considerable improvement in the repeatability characteristics of the probe.

As formerly mentioned, the housing 33 of the microswitch 31 is part of a sealingly closed chamber filled with nitrogen. This enables to keep the electrical contacts 44, 45 and 51 in an environment substantially free from humidity and oxygen, so avoiding the negative effects due to oxidation and to guarantee a high standard of reliability of the probe that remains constant in time. On the other hand, nitrogen does not interfere with the metrological performances of the probe, contrarily to what occurs in known devices in which oily fluids are utilized to protect the contacts from oxidation.

It should be realized that, in a probe according to the present invention, it is possible to substitute nitrogen with a different fluid, more specifically a different inert gas as, for example, helium (He) or argon (Ar) and achieve identical results.

The insertion and, in general, the handling of an inert gas provide, moreover, considerable advantages with respect to the handling of oily fluids insofar as the prevention of pollution in the environment is concerned, since inert gases result definitely "cleaner" and less troublesome to handle.

The manufacturing features of the probe, more specifically insofar as the coupling among the various parts and the selection of the materials are concerned, can naturally differ with respect to the ones that are illustrated and hereinbefore described without departing from the scope of the present invention.

Moreover, the structure of the microswitch 31 can take other forms with respect to what has been hereinbefore illustrated and described. For example, there can be foreseen that only one of the bars 44 and 45 provides an electric contact, the other being made from non-conductive material, while the small ball 51 is coupled to the conductors in the holes 55 for closing the electric circuit in an inoperative condition and for enabling to detect the opening of the circuit upon the release of the engagement between the small ball 51 and the conductive bar (44 or 45).

Probes with just some of the advantageous characteristics herein described fall within the scope of this invention. More specifically, a probe with a microswitch that has a known structure (for example the one shown in FIG. 2 of the previously mentioned U.S. Pat. No. 5,299,360), in which suitable elements guarantee the sealing of a chamber including the internal area of the microswitch with the electric contacts and said chamber is filled with nitrogen or other inert gas, falls within the scope of the invention too.

Probes utilizing similar electric-switch detecting devices also fall within the scope of the invention even if they have important structural differences with respect to the embodiments of FIG. 1 (Probe A and Probe B) that can regard, for example, the support of the arm-set 3 in casing 1.

The invention claimed is:

1. A touch probe, including a casing that defines a longitudinal geometric axis, a movable arm-set, housed in the casing, an arm rigidly coupled to the movable arm-set with an end extending out of the casing, a feeler coupled to said end of the arm, and and electric switch adapted for detecting displacements of the movable arm-set with respect to the casing, and including at least a stationary contact and a movable contact, a housing enclosing said stationary contact and said movable contact and a contact protective fluid, and a mechanical transmission device adapted for transmitting displacements of the movable arm-set to the movable contact wherein the casing encloses a sealingly closed chamber, the housing of the electric switch lying at the interior of said sealingly closed chamber, said contact protective fluid being an inert gas that is present in the sealingly closed chamber.

2. The probe according to claim 1, wherein said inert gas is nitrogen.

3. The probe according to claim 1, including an antirotation device adapted for preventing rotations of the movable arm-set with respect to the casing about a longitudinal axis, said antirotation device including a metal bellows fixed to the ends of the movable arm-set and to a mechanical coupling element, rigidly coupled to the casing, the metal bellows defining at least in part said sealingly closed chamber.

4. The probe according to claim 1, wherein the movable arm-set defines an axial through hole communicating with said sealingly closed chamber, the inert gas being inserted in the sealingly closed chamber through said axial through hole.

5. The probe according to claim 4, further including a closure screw and a ring gasket, wherein the axial through hole includes at least a threaded area, the closure screw being adapted to be coupled to said at least one threaded area and to lock the ring gasket for achieving the sealing of the axial through hole.

6. The probe according to claims 1, wherein the mechanical transmission device of the electric switch includes an elongate mechanical body between the movable arm-set and the movable contact, substantially longitudinal guide surfaces and an elastic thrust element adapted for urging the elongate mechanical body against said guide surfaces.

7. The probe according to claim 6, wherein the elastic thrust device includes a bent flat spring and the elongate mechanical body includes a transmission element with a substantially spherical shape adapted for cooperating with the substantially longitudinal guide surfaces urged by the bent flat spring, the transmission element including a substantially plane portion adapted for cooperating with said bent flat spring.

8. The probe according to claim 1, wherein the movable arm-set is supported in the casing by means of a cone-ball coupling the movable arm-set and the casing defining annular surfaces adapted to mutually contact and to cause, further displacements of the arm, longitudinal displacements of the movable arm-set suitable for being transmitted, by means of said mechanical transmission device, to the movable contact of the electric switch.

9. The probe according to claim 1, wherein the movable arm-set is supported in the casing by a coupling between plane annular surfaces, the movable arm-set and the casing defining, respectively, a substantially spherical portion and a substantially frusto-conical seat adapted to mutually contact and to cause, further to displacements of the arm, the partial disengagement between the plane annular surfaces and the consequent longitudinal displacements of the movable arm-set suitable for being transmitted, by means of said mechanical transmission device, to the movable contact of the electric switch.

10. The probe according to claims 1, wherein the electric switch includes a spring for urging the movable contact against said at least one stationary contact.

11. The probe according to claim 10, wherein said electric switch includes at least two stationary contacts, said spring being adapted for urging the movable contact against the two stationary contacts.

* * * * *

UNITED STATES PATENT AND TRADEMARK OFFICE
CERTIFICATE OF CORRECTION

PATENT NO. : 7,168,179 B2
APPLICATION NO. : 10/530350
DATED : January 30, 2007
INVENTOR(S) : Roberto Baruchello et al.

It is certified that error appears in the above-identified patent and that said Letters Patent is hereby corrected as shown below:

In Column 2, line 67: after "feeler," "1S" should read -- 15 --.

In Claim 1, Column 7, line 48: second occurrence of "and" should read -- an --.

In Claim 8, Column 8, lines 37-38: the term -- to -- should be inserted between "further" and "displacements.".

Signed and Sealed this

Fifth Day of May, 2009

JOHN DOLL
*Acting Director of the United States Patent and Trademark Office*